UNITED STATES PATENT OFFICE.

PETER BERGELL, OF BERLIN-WILMERSDORF, GERMANY, ASSIGNOR TO J. D. RIEDEL AKTIENGESELLSCHAFT, OF BERLIN-BRITZ, GERMANY.

PHARMACEUTICAL OR MEDICINAL COMPOUND AND PROCESS FOR PRODUCING THE SAME.

1,094,296.  Specification of Letters Patent.  Patented Apr. 21, 1914.

No Drawing.  Application filed November 25, 1913. Serial No. 803,023.

*To all whom it may concern:*

Be it known that I, Prof. PETER BERGELL, a subject of the German Emperor, residing at Berlin-Wilmersdorf, Germany, have invented a certain new and useful Pharmaceutical or Medicinal Compound and Process for Producing the Same, of which the following is a specification.

A number of febrifuges possess a sedative and antineuralgic action. Some febrifuges are also stated to possess the advantage that they favor the production of natural sleep. We possess however no synthetic medicament which is synthesized from two groups, of which one is based on a known soporific and the other on a known antipyretic. We are confronted with two problems here. A sedative and a febrifuge can be combined at once in one substance, such for example as result intact when hydrolytic dissociation takes place. A case of this kind exists for example in the known bromoisovalerylaminoaceto-para-phenetidid. A substance may, however, be also synthesized which does not yield the two pharmacological components by dissociation, but which however in its structure resembles both a soporific and an antipyretic. Only in this latter type moreover are molecular actions possible, which are of a different nature from the actions of the components.

A combined action has now been found by combining the alpha-bromoisovaleric acid radical with para-phenetidin in a manner similar to the syntheses of acetylparaphenetidid. By the action of two molecules of para-phenetidin on one molecule of bromoisovaleryl bromid in benzol solution alpha-bromoisovaleryl-para-phenetidid is obtained, which can be easily freed by re-crystallization from dilute alcohol from the phenetidin hydrobromid produced. It is found, that the bromin substitution does not impede the reaction. Thus for example 2.5 kg. of para-phenetidin are dissolved in 9 kg. of benzol and 2.2 kg. of alpha-bromoisovaleryl bromid allowed to run slowly into the solution, while this latter is being continuously stirred. The reaction takes place with a considerable rise of temperature. After all the bromoisovaleryl bromid has been introduced, the mixture is heated for another 2 to 2½ hours on a steam bath and filtered hot from the phenetidid bromo derivative which has separated. The alpha-bromoisovaleryl-phenetidid separates on cooling and is obtained pure by re-crystallization from alcohol. The constitution of the new substance corresponds to the formula

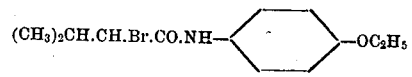

The alpha-bromoisovaleryl-phenetidid melts at 151° C., is soluble with difficulty in water, easily soluble in alcohol, ether and benzol and more sparingly soluble in xylene. From dilute alcohol it separates in large columnar crystals which are anhydrous. Toward alcoholic alkalis it is comparatively stable and is therefore only slowly decomposed. The physiological action of the new compound corresponds in a certain direction to the combination of the bromoisovaleric acid and phenetidin character. It acts as a soporific after the manner of bromoisovaleric acid amid or carbamid, does not reduce, or only slightly reduces the temperature of the body of a healthy or a feverish person, and therefore does not act as an antipyretic, but has an extraordinary antineuralgic action and is very slightly poisonous. One gram does not kill a medium sized rabbit of three kilograms. The hypnotic antineuralgic action takes place rapidly. There is no posthypnotic secondary action. In the new substance the antineuralgic action of the phenetidin and the hypnotic action of the side chain in particular work together to produce an increased effect, the former eliminating both the production of sensations which prevent sleep, such as headache and similar phenomena, while posthypnotic secondary actions are also prevented.

The new product differs from the simple mixtures of the similar known bromoisovaleric acid derivatives with acetyl-paraphenetidid advantageously by the more powerful antineuralgic and analgetic action. In a number of cases the absence of any anti-pyretic action is desirable, as for example in the case of specially anemic persons.

What I claim is:—

1. The process for the manufacture of alpha-bromiso-valeryl-p-phenetidid, which consists in causing p-phenetidin to act on alpha-bromiso-valeryl bromid, substantially as described.

2. The process for the manufacture of alpha-bromiso-valeryl-p-phenetidid, which consists in dissolving p-phenetidin in benzene, gradually introducing into the solution alpha-bromiso-valeryl-bromid, while constantly stirring, then heating the mixture, filtering and allowing the filtered liquid to cool, substantially as described.

3. As a new product, alpha-bromiso-valeryl-p-phenetidid,

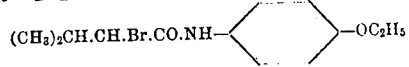

melting at 151° C., sparingly soluble in water, easily soluble in alcohol, ether and benzene, crystallizable from dilute alcohol in the shape of large column-shaped anhydrous crystals, only slowly decomposable by alcoholic alkali and possessing soporific and strong antineuralgic properties.

In testimony whereof I have hereunto set my hand in presence of two subscribing witnesses.

Prof. PETER BERGELL.

Witnesses:
 WOLDEMAR HAUPT,
 HENRY HASPER.